UNITED STATES PATENT OFFICE.

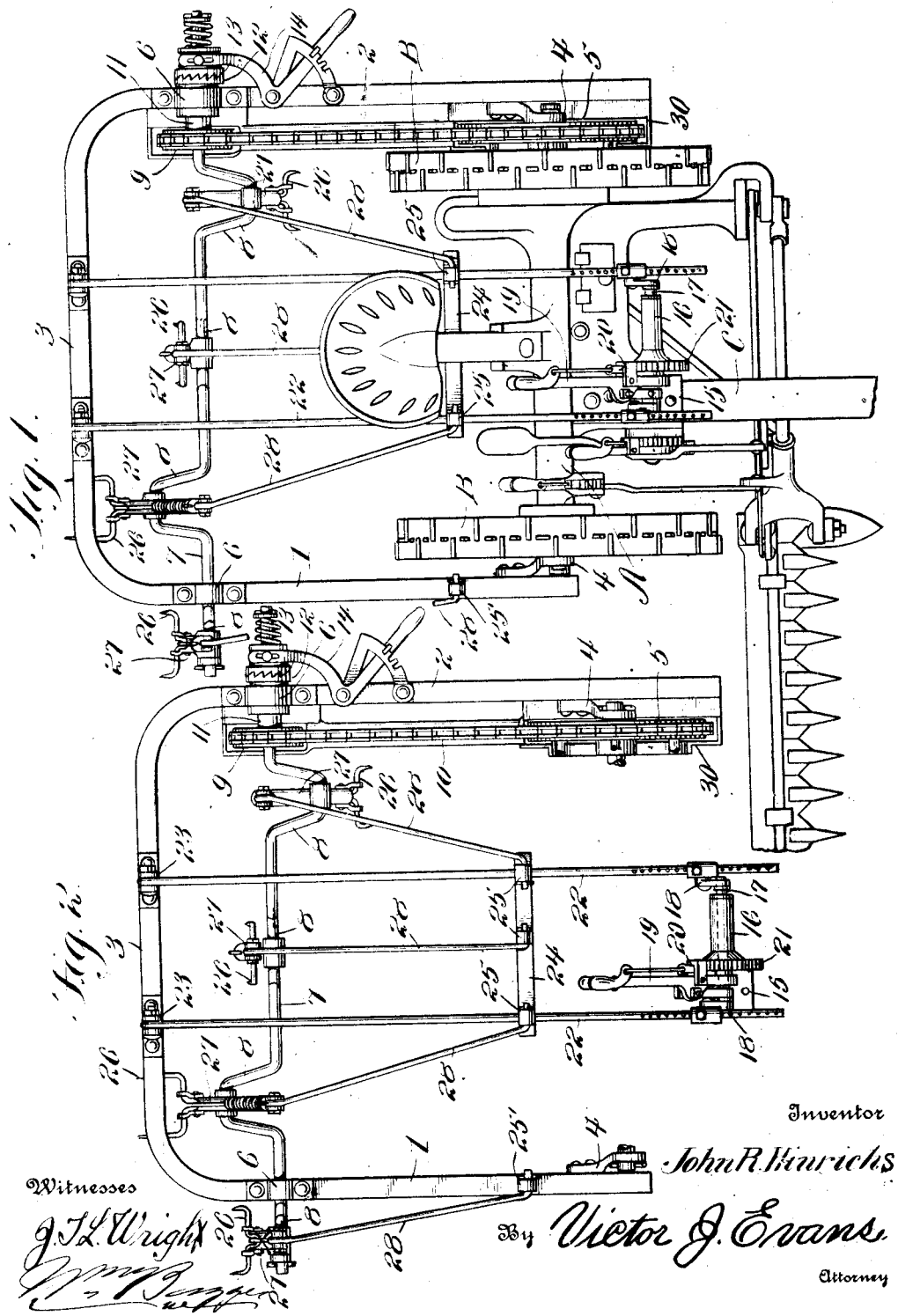

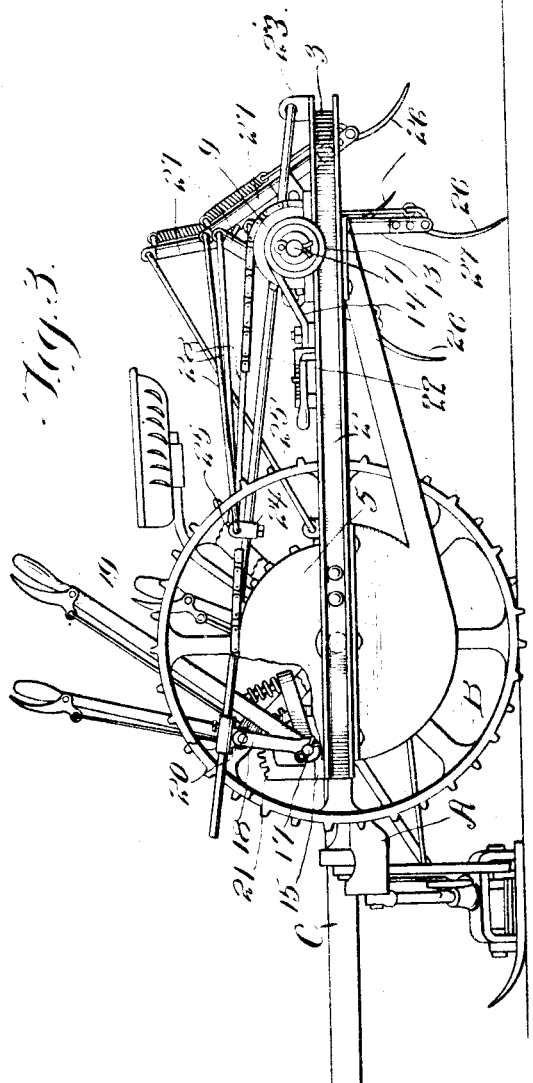
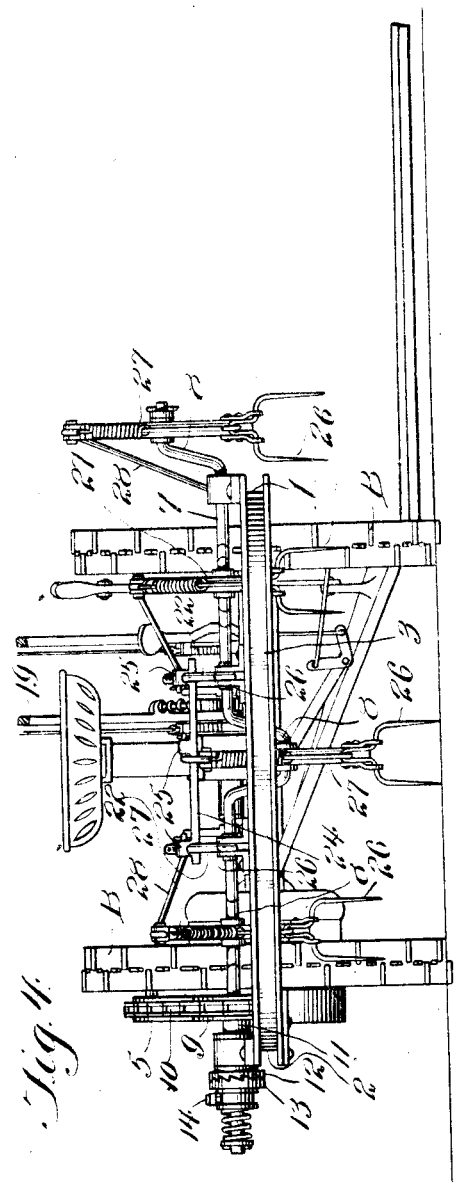

JOHN R. HINRICHS, OF MACOMB, ILLINOIS.

HAY-TEDDER.

1,055,908.  Specification of Letters Patent.  Patented Mar. 11, 1913.

Application filed July 2, 1912. Serial No. 707,266.

*To all whom it may concern:*

Be it known that I, JOHN R. HINRICHS, a citizen of the United States, residing at Macomb, in the county of McDonough and State of Illinois, have invented new and useful Improvements in Hay-Tedders, of which the following is a specification.

This invention relates to hay tedders, and it has for its object to produce a tedder of simple and efficient construction which may be conveniently attached to and operated in conjunction with a mowing machine of any ordinary conventional type, thereby attaining the double object of operating the tedder from power derived from the mowing machine, and avoiding the side draft on the mowing machine which is usually experienced and which is due to the resistance encountered by the cutting apparatus that extends to one side of the machine.

A further object of the invention is to produce a hay tedding attachment of simple and improved construction which may be readily applied to a mowing machine and which may be conveniently adjusted to throw the tedding device into and out of gear, and also to raise it from or lower it toward the ground, as may be required.

With these and other ends in view which will readily appear as the nature of the invention is better understood, the same consists in the improved construction and novel arrangement and combination of parts which will be hereinafter fully described and particularly pointed out in the claim.

In the accompanying drawings has been illustrated a simple and preferred form of the invention, it being, however, understood that no limitation is necessarily made to the precise structural details therein exhibited, but that changes, alterations and modifications within the scope of the claim may be resorted to when desired.

In the drawings,—Figure 1 is a top plan view showing the tedding device applied to a mowing machine of ordinary conventional type in position for operation. Fig. 2 is a top plan view of the tedding device detached. Fig. 3 is a side elevation of the device, as seen in Fig. 1. Fig. 4 is a rear elevation.

Corresponding parts in the several figures are denoted by like characters of reference.

The main frame of the improved tedding device is preferably made of angle or channeled iron or steel, the same being bent to approximate U-shape to present side members 1 and 2 that are connected together by a rear member or bridge piece 3. The side members 1 and 2 are provided with bracket members 4, whereby they may be pivotally connected with the frame of a mowing machine A of ordinary construction. The mowing machine has been shown as being equipped with ground engaging driving wheels B with which the pivotal brackets 4 are preferably in axial alinement.

Suitably clamped upon or otherwise connected with one of the wheels B is a sprocket wheel 5, the same lying between the mower wheel and the side member 2 of the tedder frame. The side members 1, 2 of the tedder frame are provided with bearings 6 for a shaft 7 having a plurality of cranks 8 and equipped with a sprocket pinion 9 which is connected with the sprocket wheel 5 by a chain or link belt 10. The sprocket wheel 9, which is loose on the shaft 7, is provided with a sleeve 11 carrying a clutch member 12 adapted to be engaged by a mating clutch member 13 which is slidable upon and revoluble with the shaft 7, said clutch member 13 being actuated by a shipping lever 14 whereby it may be placed into or out of engagement with the clutch member 12, which latter may be operatively connected with the shaft 7 by means of the clutch members 12, 13 when said clutch members are in engagement with each other. When this is the case, motion will be transmitted from the sprocket wheel 5 to the shaft 7 when the mowing machine is in operation, and said motion may be interrupted by disengaging the clutch members 12, 13.

Suitably mounted on the tongue C of the mower, where it may be secured by means of clamps, bolts or in any other convenient manner, is a bracket 15 having a bearing sleeve 16 wherein a shaft 17 is supported for oscillation, said shaft being provided with cranks 18 and with a lever 19 whereby it may be rocked. The lever 19 has a spring actuated catch 20 adapted to engage a segment rack 21 formed on the bracket 15 and whereby the crank shaft 17 and related parts may be held securely at various adjustments. The cranks 18 and the shaft 17 are connected by link rods 22 with lugs or brackets 23 on the bridge piece 3 of the tedder frame, which latter, by means of the lever 19 may be swung about its axis so as to raise or lower the rear end thereof. The link rods 22 also serve to support a cross bar 24 carrying ears or lugs 25. A similar ear or lug 25′ is secured on the side bar 1 of the tedder frame.

Tedder forks 26 of ordinary construction are provided with handles 27 which are pivoted on the cranks 8 of the shaft 7, said handles being also connected by link rods 28 with the ears or lugs 25 and 25′ that are located in approximate alinement with the respective cranks.

The side member 2 is extended forwardly of the supporting bracket 4, and said side member carries a shield or casing 30 which serves to inclose the lower portion of the sprocket wheel 5 and the lower lead of the chain or link belt 10 to prevent the said chain and sprocket from being clogged with grass.

It will be seen from the foregoing description, taken in connection with the drawings hereto annexed, that when the improved attachment is applied to a mowing machine and the latter is in operation, the tedder frame will extend rearwardly of the mower frame, and the crank shaft 7 will be driven by the chain or link belt 10. The tedder forks will thus be carried around by the cranks 8, being thereby reciprocated vertically, said forks receiving at the same time a rocking motion by means of the link rods 28, whereby the hay engaged by said forks will be tossed and thrown loosely in a rearward direction. At each round of the mowing machine, the swath cut by the preceding round will be engaged by the tedder attachment, and the grass will thus be tossed and loosened while still green and before it has a chance to dry and become crisp; the curing of the hay will, therefore, progress more speedily and satisfactorily than where the tedding is performed at a much later time than the mowing, and the leaves of the grass will not be broken or detached from the stems. A very material saving in labor will also be accomplished by tedding the hay simultaneously with the mowing.

Another advantage of the invention resides in the fact that the tedder is attached to the rear of the mowing machine, thereby taking the weight off the tongue, thus relieving the draft animals and lightening the draft.

Having thus described the invention, what is claimed as new, is:—

The combination with a mowing machine, of a tedder attachment comprising a U-shaped frame including a rear cross bar and forwardly extending side members, the latter pivotally associated with the mower frame, a bracket secured on the tongue of the mowing machine and having a bearing sleeve, a rock shaft supported in said sleeve and having terminal cranks, link rods connecting said cranks with the rear cross bar of the U-shaped frame, means for oscillating the rock shaft and for securing it at various adjustments, a crank shaft journaled on the U-shaped frame, means including a clutch for transmitting motion to the crank shaft from the mowing machine, tedder forks having handles fulcrumed on the cranks of the shaft, a cross bar supported on the link rods, lugs on said cross bar and on one side bar of the U-shaped frame, and rods connecting said lugs with the handles of the tedder forks.

In testimony whereof I affix my signature in presence of two witnesses.

JOHN R. HINRICHS.

Witnesses:
E. R. McLean,
Henry Hinrichs.